United States Patent [19]

Trask et al.

[11] Patent Number: 4,780,359
[45] Date of Patent: Oct. 25, 1988

[54] FIRE RETARDENT STRUCTURAL TEXTILE PANEL

[75] Inventors: Elwood G. Trask; Ronald W. Adams, both of Auburn, Me.

[73] Assignee: Gates Formed-Fibre Products, Inc., Auburn, Me.

[21] Appl. No.: 158,471

[22] Filed: Feb. 22, 1988

Related U.S. Application Data

[63] Continuation-in-part of Ser. No. 34,258, Apr. 3, 1987, Pat. No. 4,726,987.

[51] Int. Cl.$^4$ .............................................. D04H 1/16
[52] U.S. Cl. ................................ 428/234; 28/107; 156/62.8; 156/276; 156/285; 428/235; 428/236; 428/251; 428/282; 428/286; 428/287; 428/296; 428/300; 428/301; 428/311.1; 428/317.9; 428/921
[58] Field of Search ............... 428/234, 235, 236, 251, 428/282, 286, 287, 296, 300, 301, 311.1, 317.9, 921; 28/107; 156/62.8, 276, 285

[56] References Cited

U.S. PATENT DOCUMENTS 4,199,635 4/1980 Parker .................................. 428/300
4,568,581 2/1986 Peoples .............................. 428/300

Primary Examiner—Marion C. McCamish
Attorney, Agent, or Firm—J. E. Ebel; C. H. Castleman, Jr.; H. W. Oberg, Jr.

[57] ABSTRACT

A nonwoven textile panel for use as a fire retardant and sound deadening barrier in the interiors of aircraft, comprised of three layers of nonwoven textile fibers of polyphenylene sulfide fibers and Nomex brand aramid fibers that have been carded, cross-lapped, needle punched and thermally bonded by heating the panel to the temperature softening point of the polyphenylene sulfide fibers. The fibers are capable of being thermoformed and retaining a permanent shape due to the thermoplastic properties of the polyphenylene sulfide fibers.

28 Claims, 2 Drawing Sheets

FIRE RETARDENT STRUCTURAL TEXTILE PANEL

This is a continuation-in-part of pending U.S. patent application Ser. No. 07/034,258 which was filed on Apr. 3, 1987, now U.S. Pat. No. 4,726,987, issued 02/22/88.

BACKGROUND OF THE INVENTION

This invention relates to a fibrous, nonwoven textile panel, and more specifically relates to a textile panel suitable for use as a fire retardant structural fascia that utilizes a construction relying on several layers of nonwoven textiles to create a skeletal support which can be utilized as a fire retardent panel or have other layers of textile or non-textile components attached thereto to form a finished panel.

FIELD OF THE INVENTION

Nonwoven textile panels are gaining increased recognition and use in applications requiring pleasing visual and tactile qualities. The familiar example of their use is the carpet-like lining of a trunk space of a car. Depending on the specific technology chosen, a nonwoven textile panel can also have significant rigidity, making it desirable in situations calling for a rigid or semi-rigid structural piece, often known as structural fascia. When lining the interior of the compartment, especially a compartment to be used for transportation purposes, it is frequently desirable to not only have an aesthetically pleasing appearance and feel, but also to provide for a certain amount of sound deadening quality and thermal insulating capability. Furthermore, it may be desirable, or even a requirement, to have a compartmental lining which is at least fire retardant, if not completely fire resistant. This is especially true in aircraft interior applications. Research and Development has come up with a variety of fibrous and non-fibrous materials that are fire retardant and have a suitable fabrication into some type of interior finishing material.

Polybenzimidazole (PBI) is the only textile fiber, either commercial or developmental, which under normal conditions is not flammable in air, emits little or no smoke, and produces virtually no toxic offgases up to a temperature of 560° C. PBI has textile processing properties that are similar to polyester fiber, and garments made from PBI have a high level of comfort. PBI's useful temperature of 560° is, by comparison, about 200° C. higher than that of other commercial high temperature or organic fibers. Commercially, PBI has been developed by Celanese Corporation. Interestingly, PBI has many of the high comfort characteristics of cotton fibers. One of the earliest applications of PBI fibers was its use as woven cloth in fire resistant flight suit fabrics for the Air Force and NASA. In addition to its use as a fiber, PBI can also be produced as a foam, as an adhesive (which not only has good high temperature capabilities but also has very good cryogenic properties), as flat sheets (or films), and as hollow fibers.

Fibers formed by reactions that lead to aromatic polyamides are known generically as aramids. According to the U.S. Federal Trade Commission, an aramid is manufactured fiber in which the fiber forming substance is a long chain synthetic polyamide in which at least eight-five percent of amide (—CO—NH—) linkages are attached directly to aromatic rings. (By contrast, nylon is defined as manufactured fibers in which the fiber forming substance is a long chain synthetic polyamide in which less than eight-five percent of the amide linkages are attached directly to aliphatic moieties.)

The first aramid fiber to be developed was commercialized under the tradename Nomex (registered trade mark) by the DuPont Company in 1967. Nomex is based on poly (m-phenyleneisophthalamide) (MPD-I). An even higher modulus fiber known as Kevlar (registered trade mark) is another well known aramid fiber, being based on poly (p-phenyleneterephthalamide) (PPD-T).

Although aramid fibers do not melt in the conventional sense, they display an endothermic peak in the differential thermoanalysis thermogram test, and also display glass transition points which range from about 250° to about 400° C. Despite the fact that aramid fibers do not melt in the conventional sense, they do however, show softening points. At elevated temperatures that would cause conventional textile fibers to lose all of their tensile strength, aramids have tensile strengths that are characteristic of such conventional textile fibers at room temperature. For example, nylon 6,6 loses all of its strength at about 205° C., whereas aramid fibers will not exhibit a fall-off of tensile modulus until around 350° C.

Upon burning, aramid fibers produce a thick char which acts as thermal barrier that prevents serious burns to skin. Some aramid fibers, such as Nomex, shrink away from a high heat source. Durette fabrics, based on Nomex that has been treated with hot chlorine gas or other chemical reagents to promote surface cross-linking which stabilizes the fibers, were subsequently developed for greater dimensional stability on exposure to high heat sources.

Certain aramids have considerable potential as high temperatures dielectrics due to their high dielectric strength. For example, aramids have a break-down voltage of 76 volts per millimeter of temperatures up to 180° C., while by comparison the breakdown voltage for nylon 6,6 is only 3 volts per millimeter at 150° C.

Aramid fibers in general are more resistant to acid than nylon 6,6 fibers, that are not as acid resistant as polyester fibers. They do, however, have superior resistance to strong alkali and also exhibit superior hydrolytic stability, as compared to polyester and nylon 6,6. Aramid fibers are very difficult to dye, although it can be accomplished by using a cationic dye at elevated temperature in a pressurized dying machine.

Polyimides, poly(imide-amides) and other specialty plastics are recognized as having great usefulness for their chemical and flame resistance. Aromatic polyimides have also been considered as aramids, although there is some disagreement on this definition. The aromatic poly(imide-amides) have been defined as synthetic linear macromolecules made from aromatic groups joined by amide linkages in which at least eight-five percent of amide linkages are joined directly to aromatic rings and in which imide groups may be substituted for up to fifty percent of the amide groups. Aromatic polyimides are characterized by high char formation upon pyrolysis, low flammability and low smoke production when immersed in flame.

Aromatic polyethersulfones are strong, tough, rigid engineering themoplastics with good thermal stability and creep resistance, which find applications where special combinations of mechanical, thermal or fire resistance properties are desired. Polyphenylene sulfide, which is commercially known as Ryton (registered trade mark) is a high melting crystalline material with outstanding chemical resistance, thermal stability and fire resistance. Like the aromatic polyimides, it is a char former, which will produce essentially no volatile outgases below 500° C. The fire resistance of polyphenylene sulfide is comparable to that of the best polyether sulfones, and it is probably the least flammable of any of the non-halogen containing thermoplastics.

Polyether-ether ketone (PEEK) fibers can be used continuously at high temperatures of up to 240° C., and even at the very highest working temperatures, Show excellent resistance to alkalis and most acids. It is extremely stable in wet environments, and is not affected by radiation. In the past, PEEK has been used as a film, a tape, a material for acoustic speaker diaphragms and cones, and most frequently as a composite reinforcement along with carbon fiber in aerospace applications. PEEK is commercially available under the brand name TALPA-2000 from Sanyo Corporation. We have found that fibers made of PEEK, although originally intended by their manufacturer to be used as reinforcement in composites, can be used in our nonwoven textile fiber fire retardant applications.

Fluoropolymers are also generally used for their resistance to temperature, chemicals and combustion. The most familiar of these is polyvinylfluoride and polyvinylchloride. Polyvinylchloride (PVC) is the less flammable of the two and appears to pyrolyze in two stages. There is no weight loss up to 250° C., but then hydrogen chloride begins to evolve above this temperature. The evolved hydrogen chloride exhibits good efficiency in quenching flames. This tends to make PVC (vinyl) somewhat more attractive in selecting the materials for fire retardant applications.

Rayon is a cellulosic fiber that exhibits good scorch resistance at elevated temperatures, but above which is subject to combustion unless specially treated. Such specially treated rayon fibers are commercially avilable through Avtex Corporation and others. Rayon is insoluble in most ordinary solvents and is relatively easy to dye.

As can be seen from the foregoing discussion, there are several fiber and material types available for a materials designer to use in a flame retardant application. Each of these materials, however, has its own inherent disadvantages in terms of ease of processing. No single one of these fiber or material types is capable of forming a structural fascia which will have excellent fire retardant qualities, low outgassing, good sound deadening qualities, good thermal insulating qualities, pleasing feel and pleasing appearance. These are all desirable characteristics of a panel suitable for use in lining an interior compartment of a commercial aircraft. The solution is to find a technology that can take several different materials and combine them into one integrated panel. The present invention can take any of the aforementioned flame retardant materials, in various combinations thereof, to form them into a fire retardant structural fascia with all of the above desirable characteristics and qualities.

The present invention features the use of needle punching technology to combine staple fibers of different fiber types in order to take advantage of their fire retardant and structural qualities. In needle punching technology, a set of barbed needles is made to reciprocate up and down through a batt of staple fibers. As the barbs on the needles snag individual staple fibers, the fibers are interspersed and intermingled with one another, and simultaneously are compacted against each other. This results in a uniform, random mix or blend of the fiber types that were present in the initial fiber mix, which are sufficiently integrated with and packed against one another to minimize fiber tear-out or bearding. This results in the distinct advantage of being able to produce a fiber panel that has any desired percentage mix of flame retardant fibers, with the mixing being capable of being done at the processor's manufacturing plant. This is important, since usually primary fiber suppliers are not able to supply a given desired percentage mix of different fiber types.

SUMMARY OF THE INVENTION

One embodiment of the fire retardant structural textile panel of the invention comprises a core of a first and at least a second fiber that has been processed into a nonwoven, fibrous batt having a top side and a bottom side. Two separate nonwoven, fibrous batts are prepared and are attached to and sandwich the core to form an inner subassembly. In another embodiment of the fire retardant structural textile panel of the present invention, in addition to the core, four other nonwoven fibrous batts are prepared which constitute, respectively, a top side innerface, a top side intermediate face, a bottom side inner face, and a bottom side outer face. The top side inner face and the bottom side inner face are attached to and sandwich the core to form an inner subassembly. The top side intermediate face and bottom side outer face are then attached to and sandwich the inner subassembly to form a skin support assembly. Finally, a skin is attached to the top side of the skin support assembly. Generally, the skin will be PVC (vinyl) or similar material, but the skin can also be a fibrous textile.

DETAILED DESCRIPTION OF THE DRAWINGS

Figure 1:
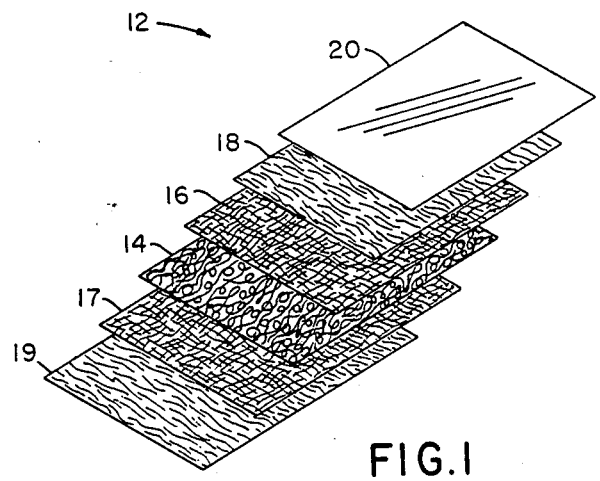
FIG. 1 is an exploded view in perspective of the components of a preferred embodiment of the invention.

Turning first to FIG. 1, there is shown generally at 12 an exploded perspective view of the components of an embodiment of the invention prior to assembly. At the center there is a core material 14 which is preferably a blend of 2 or more staple fibers that have been chosen so as to have temperature softening points of sufficient disparity such that when heated to the temperature softening point of one fiber type, the other fiber types will not be affected. Alternatively, one or more of the fiber types in the core may be non-melting within these temperature ranges, for example fibers of a glass or carbon fibers. During the subsequent thermoforming process, which is described in more detail below, as the fibers of the lowest temperature type start to melt or soften, they fuse to each other and to the fiber types present to form a good bond upon subsequently being cooled. The fiber types in the central core may simply be loose, unconsolidated fibers, or they may have been combed, carded and cross-lapped into a loosely consolidated bulky batt, or they may have been even further consolidated by needle punching.

Sandwiching the upper and lower surfaces of the core 14, are top side and bottom side inner faces 16 and 17. Generally, the top side and bottom side inner faces 16 and 17 will be comprised of the same fibers, or, if a blend or more than one fiber type is used, the top side and bottom side inner faces will have the same fiber type ratio, although this is merely preferred, not absolutely required. The fibers chosen for the top side and bottom side inner faces do not necessarily bear any relation to the fibers chosen for the core 14. They have simply been chosen for the fire retardant qualities they display, after their structural integrity characteristics by processing have been completed. Generally, they will have been combed, carded and cross-lapped into bats or webs prior to being brought into contact with the core 14. Additionally, they may have been needle punched to consolidate the batts for easy handling before being brought into contact with the core 14.

The top and bottom side inner faces 16 and 17 are attached to the core 14 by the technique of needle punching. This is performed according to techniques well known to those skilled in the art and is set out in great detail in U.S. Pat. No. 4,199,635 and 4,424,250, the disclosure of which are incorporated herein by reference. Needling the top side and bottom side inner face 16 and 17 to the core 14 produces an inner subassembly. To the top side and bottom side of the inner subassembly there will then be attached a top side intermediate face 18 and a bottom side outer face 19. The top side intermediate face 18 and the bottom outer face 19 will generally have the same composition, either being made of the same fibers, or if a blend is involved, being made of the same ratio of blended fibers, although this is merely preferred, not required. Again, the top side intermediate face and bottom side outer face will be staple fibers that have been combed, carded and cross-lapped into nonwoven webs or batts which themselves will be attached to the top and bottom sides of the inner subassembly, resulting in the formation of a skin support assembly.

A skin 20 is then attached to the top side of the skin support assembly. The skin, usually being a vinyl or vinyl-like material, can be adhered or attached to the top side intermediate face by any manner known to those skilled in the art. It will be apparent to those skilled in the art that although it is preferred that the top side and bottom side inner faces 16 and 17 and the top side intermediate and bottom side outer faces 18 and 19 are respectively identical to each other, it is not necessary for this to be the case. The top side and bottom side inner faces or the top side intermediate face and the bottom side outer face can vary in their fiber content from each other depending on the structural characteristics that the final product will need to display in its intended application. Fluoro plastics can also be utilized as skin 20. Examples of fluoro plastics suitable for use as skin 20 are polyvinyl fluoride, such as TEDLAR manufactured by E. I. DuPont de Nemours, Co., polyvinylidene fluoride, such as KYNAR manufactured by Penwalt Corporation, and ethylenecholorotrifluoroethylene copolymer, such as HALAR manufactured by Ausimont, U.S.A.

Figure 2:
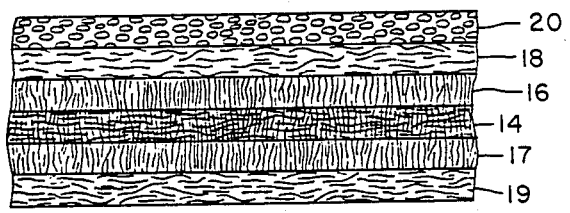
FIG. 2 is a sideways cutaway view of the various components of a preferred embodiment of the invention, after the steps of needle punching and thereomoforming have been completed.
Figure 3:
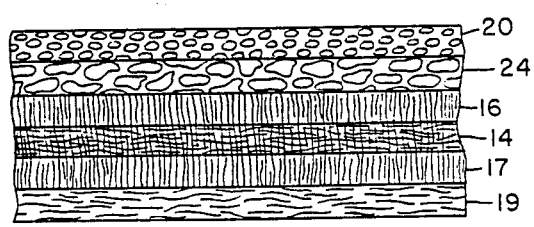
FIG. 3 is again a sideways cutaway view of one preferred alternative embodiment of the invention, again with the processing steps having been completed.

FIG. 2 illustrates a side view of the embodiment of FIG. 1 after all processing steps have been completed. FIG. 3 illustrates an alternative embodiment of the invention in which the top side intermediate face 18, which will usually be made of a fibrous batt, has been replaced with a top side intermediate face comprised of a polymer foam material 24. The alternative embodiment which uses foam beneath the outer skin is better at absorbing impacts and will have a more resilient hand feel.

When fiber is used beneath the vinyl skin, the vinyl is less likely to be stretched or stressed beyond its yield strength since the fiber layer will have less "give" than the foam would. In broad terms, this can be seen as an important advantage of the present invention over previous methods of underlaying vinyl. Generally, vinyl is installed or applied over a solid, non-yielding surface, or it is applied over foam when yield and resiliency are required. In an application which requires a certain amount of yield and resiliency, it also would be benefitted from having an underlay that would be less likely to shrink away from the vinyl and cause its premature deterioration. It can be seen that the invention comprises an excellent combination of vinyl (or some other skin) and a vinyl-bearing substrate.

On the other hand, we have found that when foam is used instead of fiber underneath the vinyl skin, the foam acts as an internal heat shield during processing of the panel. This is especially true when Ryton is one of the fire retardant components of the panel. During processing, the panel will be heated, and Ryton will absorb great quantities of heat. The Ryton will radiate this absorbed heat throughout the panel and into a PVC (vinyl) skin, causing it to soften and distort. The presence of the foam however, being an effective heat shield, protects the vinyl from the heat being radiated by the Ryton to preserve its appearance.

Figure 4:
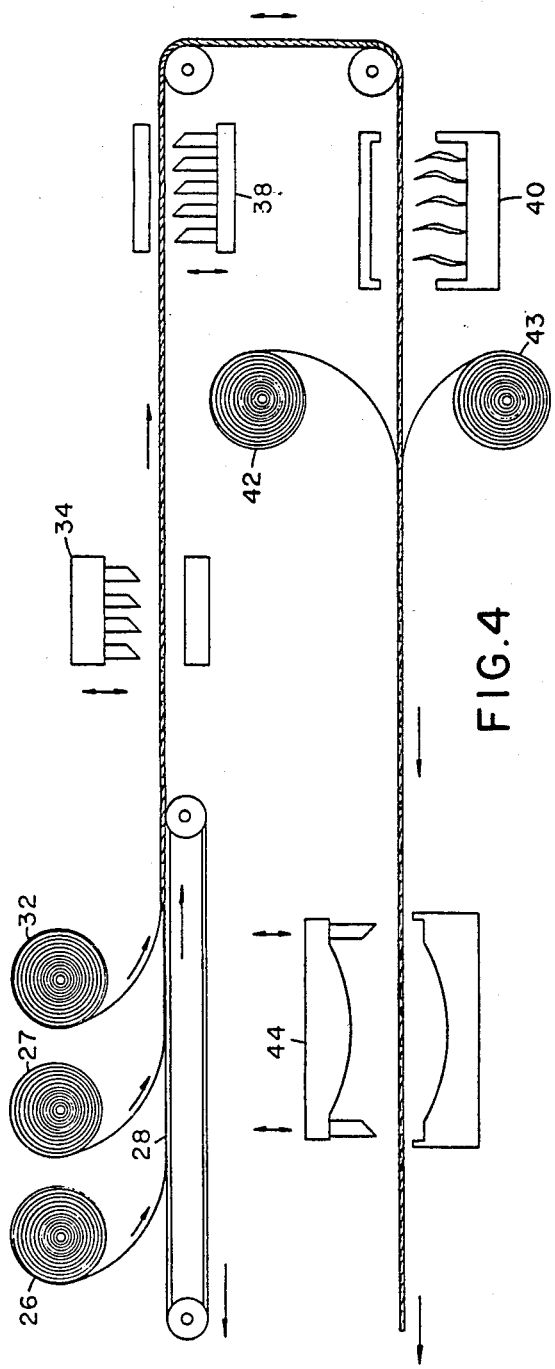
FIG. 4 is schematic diagram illustrating various steps in manufacture of a preferred embodiment of the invention.

Turning now to FIG. 4, there is illustrated schematically a preferred manufacturing and processing steps for the the fire retardant panels of the present invention. Fibers or blends of fibers comprising the bottom side inner face, the core, and the top side inner face are laid down from respective sources 26, 27 and 32 onto a conveying means 28. In this manner, the core, which is either a single fiber type or a blend of fibers, is sandwiched between the top side inner and bottom side inner layers. These three components are consolidated by a needle punching means 34 on the top side, and a second needle punching means 38, which consolidates the bottom side. After the respective consolidation operations, a subassembly is formed which is transported to a heating means 40 which will heat the subassembly to the temperature required for the melting or softening point of the fibers selected to be bonding or fusing fibers. While the inner subassembly is still hot enough, the bottom side outer layer and the top intermediate layer are made to sandwich the inner subassembly from their respective sources 42 and 43. At this point it should be noted that in a preferred method of assembly, 42 actually represents a source of top side intermediate material that has been prelaminated (most preferably by chemical adhesion) to the top side skin. Again, it will be remembered that the top side intermediate layer can either be a fibrous batt or a layer of foam.

Figure 5:
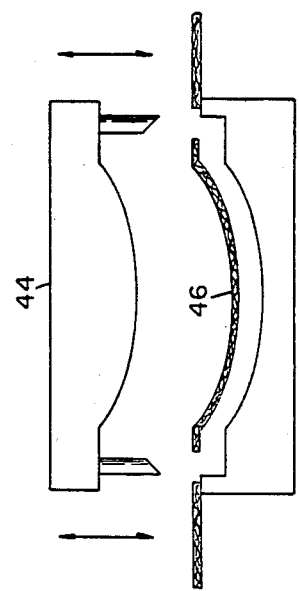
FIG. 5 is schematic drawing illustrating an optional step of thermoforming material made in accordance with the present invention.

When the bottom side outer face and the combined top side intermediate face and top side skin have been laid onto the heated inner subassembly, the hot partially melted or softened fusion fibers in the inner subassembly will come into direct contact with the fibers of the bottom outer layer and the top side intermediate layer, thus binding to them. This process is enhanced by application of pressure in a thermoforming means 44. The thermoformer, besides applying pressure to the components of the panel to assure that they will be firmly bonded to each upon subsequent cooling of the heated fibers, will also mold the panel into a desired predetermined shape in accordance with molds that have been installed in the thermoforming means, all according to the thermoforming techniques well know to those skilled in the art. The result will be a shaped, contoured product schematically illustrated in FIG. 5 at 46.

Alternatively, the thermoforming step can take place without the top side skin being in place, which can be laminated in a separate final assembly step, if desired.

In the embodiment of the invention utilizing a core of a first and at least a second fiber, either the first fiber or any subsequent fiber may be selected from a group consisting of, but not limited to, polyamides, polybenzimidazole poly(imideamides), aramids, sulfars, fibers of a glass, carbon fibers, or fibers of polyether-ether ketone. In general, the fibers chosen to form the core shall be fibers which exhibit inherent fire retardancy and low smoke generation and offgasing at elevated temperatures. If a construction has been chosen so as to utilize more than two types of fibers in the core, such third or any other subsequent fibers may also be selected from the preceding group. Of the fibers previously mentioned herein, it has been found that the following fiber types are particularly well suited to be used in fire retardant applications: polybenzimidazole fibers, polyether-ether ketone fibers, aramid fibers derived from poly(m-phenylene-isophthalamide) or poly(p-phenylene-terephthalamide), or aromatic poly(imide-amides). Also of particular utility are polyphenylene sulfide fibers.

Logically, any fibers chosen for any of the five fibrous components of the invention (or four fibrous components of the invention if the foam is used beneath the skin) will be most useful as fusion fibers if they are capable of being thermoformed. Again, it should be understood that the top side inner face and bottom side inner face are capable of being formed (by which term it is meant carded, air laid, wet laid, spun bonded, melt blown, hydroentangled or needle punched) from at least one and most preferably two fiber types, generally present in a ratio ranging from 10 to 1 through 1 to 1 by weight. If one fiber is utilized to form faces 16 and 17, the fiber chosen will be a fusion fiber. This statement holds true for the top side intermediate inner face and bottom side outer face, although in our most preferred embodiment these are usually 100 percent of single fiber type.

Although the top side intermediate face can be attached to the top side of the subassembly by thermobonding, should the processor desire, it could also be attached by needle punching or by use of an adhesive that would be caused to set after exposure to a heating means such as a typical oven. The choice of bonding means is generally up to the processor, depending on fiber types that have been chosen for the subcomponents of the assembly.

When two fiber types are present in the core, they can be present in a relative ratios varying from 10 to 1 through 1 to 1 by weight, with the ratio of 4 to 1 through 1 to 1 by weight being more preferable, at a relative ratio of 1 to 1 by weight being the most preferred. It has been found to be more advantageous when the fibers selected for the core have a higher average denier than the fibers selected for the top side inner face or the bottom side inner face. Also, it is more advantageous when the fiber selected for the top side and bottom side inner faces have been more densely needled than the fibers in the core.

As illustrated in FIG. 1, the inner subassembly defined by core 14 and inner faces 16 and 17 attached thereto can be utilized as a fire retardant panel. The inner subassembly will be thermoformed in a manner previously described to obtain a desired predetermined shape. It may be desirable to attach a woven or knitted glass fabric as a bottom side outer face 19 to the exposed surface of face 17 to serve as a flame barrier to retard flame advancement through the panel. Examples of fabrics suitable for use as a flame barrier are woven fiberglass fabrics, such as a 4 harness sateen fiberglass manufactured by Burlington Industries under style number 120/550 and an 8 harness sateen fiberglass manufactured by Burlington Industries under the style number 1581/504, and knit fiberglass fabrics, such as a 2 bar Raschel warp knit fiberglass manufactured by Fiberite under style number 10104. The woven or knit glass fabric can be attached by being pressed into the exposed surface of face 17 during thermoforming and, if desired, can be preformed to face 17 by needling prior to thermoforming. In the event an outer surface having a greater finish than that of face 16 is desired, a top side intermediate face 18, a face 18 and a skin 20, or a polymer foam material 24 and a skin 20 can be attached to the exposed surface of face 16 as illustrated in FIGS. 1 and 2 in a manner previously described herein.

Panels made in accordance with the method disclosed here will simply snap into place in preinstalled fitting receptacles in aircraft interiors or automobile interiors. Their modulus and flexibility give them sufficient spring bias to be snapped into such openings. Conventional aircraft interior panels, which rely on a core of honeycombed Nomex fibreboard with a fiber glass skin, do not display this degree of resiliency and cannot as easily be snapped into place. Moreover, the technique of manufacturing panels from honeycombed Nomex fibreboard is very time consuming, resulting in an average cycle time of approximately eight hours versus approximately one hour or less cycle time for the method of the invention here.

Yet another alternative embodiment of the invention uses a powder adhesive on an embodiment which uses foam as the top side intermediate layer. After applying the power adhesive, a vinyl skin is then vacuum formed over the foam to produce a product with an overhanging vinyl lip instead of just having a cutoff edge. This means that custom jobs and relatively small orders calling for specialized vinyls or vinyl-like materials are easily integrated into the processors' manufacturing operation.

The following examples will serve to further illustrate the making and use of this invention.

EXAMPLE 1

A fibrous batt was prepared consisting of 50% polyphenylene sulfide fibers and 50% Nomex brand aramid fiber. Two batts that had been prepared of 100% polyphenylene sulfide fibers where then attached as bottom and top layers by means of needle punching on a needle loom. A batt of 100% Nomex brand aramid fibers was then needled to the bottom side of the core subassembly. A second batt of 100% Nomex brand fiber is needled and then bonded to the top of the core subassembly, which had been heated to a temperature sufficient to soften the polyphenylene sulfide fibers that were on top of the core subassembly. To the outside of the resulting skin subassembly, there was then laminated an exterior skin of PVC (vinyl).

EXAMPLE 2

A central core layer was prepared, comprised of a 50-50% by weight blend of a 5.5 denier Nomex brand aramid fiber and 3 denier polyphenylene sulfide fiber having a weight of 15 ounces per square yard. Top side and bottom side inner faces were prepared and sandwiched to the core, which faces were comprised of 85-15% by weight blend of 3 denier polyphenylene sulfide and 2 denier Nomex brand aramid fiber with a weight of 10 ounces per square yard each. The coarser denier Nomex in the core provides bulk and loft, while the finer denier Nomex aramid fiber in the top side and bottom side inner faces provides more individual fibers per pound for reinforcement of the skin to prevent cracking. This resulting subassembly is then thermoformed, at which time the polyphenylene sulfide fibers in the faces and the core melt to form rigid outer skins and a resin bonding of the inner core. This subassembly passes Federal Aviation Regulations Part 25.853A, Boeing Material Technology Test BSS 7230, Boeing Smoke Generation by Material Upon Combustion Test BSS 7238, Boeing Toxic Gas Generated by Materials on Combustion Test BSS 6239, and University of Kansas Flight Research Laboratory Noise Reduction Testing. Accordingly, this subassembly can be employed as a fire retardant panel for use, in for example, aircraft or automobile interiors.

EXAMPLE 3

A central core layer was prepared comprised of a 50-50% by weight blend of a 2 denier, 11 micron diameter cardable glass fiber manufactured by Owens-Corning Fiberglass, Corp. under the production description H-700 glass fibers and a 3 denier polyphenylene sulfide fiber having a weight of 15 ounces per square yard. Two faces were prepared and sandwhiched to the core, which faces were comprised of 85-15% by weight blend of 3 denier polyphenylene sulfide and 2 denier Nomex brand aramid fiber with a weight of 10 ounces per square yard. This resulting assembly was thermoformed, at which time the polyphenylene sulfide fibers in the faces and the core melted to form rigid outer skins and a resin bonding of the inner core.

It is thought that the fire retardant structural textile panel and method of the present invention and many of its attendant advantages will be understood from the foregoing description, and it will be apparent to those skilled in the art that various changes may be made in the form, construction and arrangement of the parts thereof without departing from the spirit and scope of the invention or sacrificing all the material advantages of it. The forms herein described are merely preferred embodiments, and the description should not be construed or interpreted as the only embodiments. Although this description has largely discussed application of this invention to the production of a panel suitable for use as a fire retardant barrier in the interiors of aircraft, this is only one major application of the technology and other applications are not intended to be precluded. These may include, but are not limited to, dashboards and other interior portions of trucks, cars, boats or ships, or structural elements of dwellings. The following claims should therefore be interpreted as broadly as is reasonable.

What is claimed is:

1. A fire retardant panel comprising:
   a non-woven fibrous core member comprised of a first staple fiber selected from the group consisting of a polyamide, a poly(imideamide), an aramid, a glass, a sulfar, a polyether-ether ketone, a carbon fiber, and a polybenzimidazole and a second staple fiber selected from the group consisting of a polyamide, a poly(imideamide), an aramid, a glass, a sulfar, a polyether-ether ketone, a carbon fiber, and a polybenzimidazole, said first and said second fibers being selected to have differing temperature softening points, inherent fire retardancy, and low smoke generation and offgassing at elevated temperatures, said core member having a first face and a second face;
   a first non-woven, fibrous outer member being secured to said first face; and
   a second non-woven, fibrous outer member being secured to said second face.

2. The panel of claim 1 wherein said the first fiber is selected form the group consisting of a glass fiber, polypheneylene sulfide and aramid fibers derived from poly(m-phenyleneisophthalamide).

3. The panel of claim 1 wherein said second fiber is selected from the group consisting of a glass fiber, polypheneylene sulfide and aramid fibers derived from poly(m-phenyleneisophthalamide).

4. The panel of claim 1 wherein said first outer member and said second member are comprised of fibers selected from a group consisting of a polyamide, a poly(imideamide), an aramid, a glass, a sulfar, a polyether-ether ketone, a carbon fiber, and polybenzimidazole.

5. The panel of claim 4 wherein said first outer member and said second outer member are comprised of two fiber types having differing temperature softening points.

6. The panel of claim 5 wherein said two fiber types are present in relative ratios ranging from 10 to 1 through 1 to 1 by weight.

7. The panel of claim 1 wherein said first fiber and said second fiber are present in relative ratios ranging from 10 to 1 through 1 to 1 by weight.

8. The panel of claim 1 further comprising:
   a flame barrier member comprised of a woven or knitted glass fabric and secured to said second outer member.

9. The panel of claim 1 further comprising:
   a top side intermediate face of fibers that have been formed into a nonwoven fibrous batt and secured to said first outer member.

10. The panel of claim 9 further comprising:
    a top side outer face of a flexible, soft skin secured to said top side intermediate face.

11. The panel of claim 10 wherein said skin is comprised of a material selected from the group consisting of a vinyl or a fluoro plastic.

12. The panel of claim 1 further comprising:
    a top side intermediate face of a polymer foam material which is secured to said first outer member.

13. The panel of claim 12 further comprising:
    a top side outer face of a flexible, soft skin secured to said top side intermediate face.

14. The panel of claim 13 wherein said skin is comprised of a material selected from the group consisting of a vinyl or a fluoro plastic.

15. A fire retardant panel comprising:
   a non-woven fibrous core member comprised of a sulfar fiber and an aramid fiber, said core member having a first face and a second face;
   a first non-woven, fibrous outer member secured to said first face and comprised of a sulfar fiber and an aramid fiber; and
   a second non-woven, fibrous outer member secured to said second face and comprised of a sulfar and an aramid fiber.

16. The panel of claim 15 wherein said sulfar fiber in said core member is a fiber of polyphenylene sulfide.

17. The panel of claim 16 wherein said aramid fiber in said core member is an aramid fiber derived from poly(m-phenylene-isophthalamide).

18. The panel of claim 17 wherein said ratio of sulfar to aramid fiber in said core member is 1 to 1 by weight.

19. The panel of claim 15 wherein said sulfar fiber in said first outer member and said second outer member is a fiber of polyphenylene sulfide.

20. The panel of claim 19 wherein said aramid fiber in said first outer member and said second outer member is an aramid fiber derived from poly(m-phenylene-isophthalamide).

21. The panel of claim 20 wherein said ratio of sulfar to aramid fiber in said first outer member and said second outer member is 1 to 1 by weight.

22. The panel of claim 15 further comprising:
   a flame barrier member comprised of a woven or knitted glass fabric and secured to said second outer member.

23. The panel of claim 15 further comprising:
   a top side intermediate face of fibers that have been formed into a nonwoven fibrous batt and secured to said first outer member.

24. The panel of claim 23 further comprising:
   a top side outer face of a flexible, soft skin secured to said top side intermediate face.

25. The panel of claim 24 wherein said skin is comprised of a material selected from the group consisting of a vinyl or a fluoro plastic.

26. The panel of claim 15 further comprising:
   a top side intermediate face of a polymer foam material which is secured to said first outer member.

27. The panel of claim 26 further comprising:
   a top side outer face of a flexible, soft skin secured to said top side intermediate face.

28. The panel of claim 27 wherein said skin is comprised of a material selected from the group consisting of a vinyl or a fluoro plastic.

* * * * *